July 8, 1930.  W. K. ANDREW  1,770,058

CLAMPING DEVICE

Filed March 22, 1926

INVENTOR
William K Andrew
BY
Fred G Parsons
ATTORNEY

Patented July 8, 1930

1,770,058

UNITED STATES PATENT OFFICE

WILLIAM K. ANDREW, OF MILWAUKEE, WISCONSIN, ASSIGNOR TO KEARNEY & TRECKER CORPORATION, OF WEST ALLIS, WISCONSIN

CLAMPING DEVICE

Application filed March 22, 1926. Serial No. 96,666.

This invention relates to clamping devices and more particularly to a type of clamping device adapted to secure work pieces at various points without unequalized strain and consequent distortion of the work piece.

When the nature of the work piece is such that it must be located or positioned from a relatively minor surface portion for machining operations at a point relatively distant from the locating surface or portion, it is of great importance that no unbalanced strains should be set up by supports or clamps which are applied to steady the portions relatively distant from the locating portion, and it is a purpose of the invention to avoid distortion of even relatively frail work pieces under such conditions.

Another purpose is to provide clamping devices whereby one or more clamps may be applied for initially locating or positioning a work piece, after which one or more other clamps or supports may be later applied at other points on the work piece without the possibility of setting up unbalanced strains tending to distort the work.

Another object is to simplify and improve the construction and operation of clamping devices.

Still other objects will be apparent from this disclosure to those familiar with the art within which this invention is applied.

The invention consists in certain novel features of construction, arrangement, and combination of parts as hereinafter particularly described and claimed.

In the accompanying drawings the same reference characters are used for the same parts in each of the several views.

Figures 4, 5:
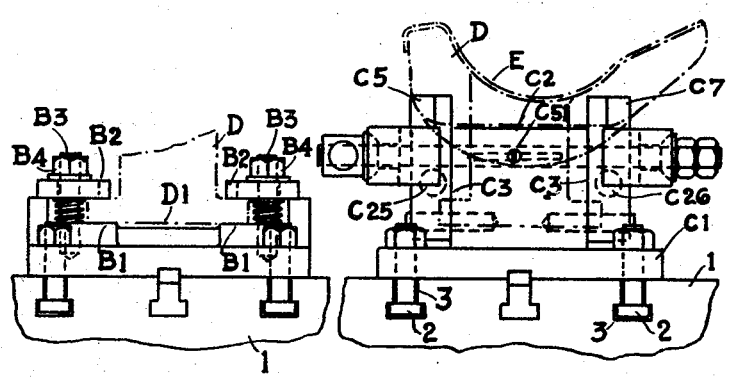
Fig. 4 is an end elevation, taken from the right of Fig. 1 of the right hand clamp unit.
Fig. 5 is an end elevation of the center clamp unit shown in Fig. 1.

A base 1, which may be the table of the machine tool upon which the machining operation is to be performed supports clamping units A, B, and C which are each removably fixed thereon by the means of T bolts 2 and T slots 3 in a well known manner, and together support a work piece D for the machining of a surface which in this instance extends the full length of the work piece and is of a form best illustrated at E in Fig. 4.

The center clamp unit B provides surfaces $B^1$ against which a surface $D^1$ of the work piece D is clamped by the means of straps $B^2$, studs $B^3$ and nuts $B^4$. When the nuts $B^4$ are loosened the straps may be removed or drawn back for the purpose of removing and replacing work pieces.

Figure 1:
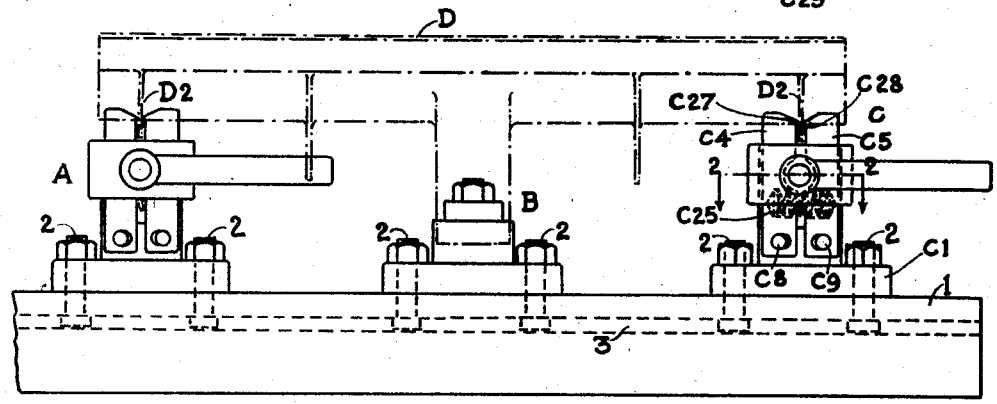
Fig. 1 is a front elevation of a clamping device embodying a preferred form of the invention.

When clamped by unit B the position of the work piece is fixed relative to base 1. The ends of the work piece projecting to right and left of unit B in Fig. 1 are provided with rib portions $D^2$. Since the surface $D^1$ of the work piece is short in the direction of the length of the work piece it is desirable to support the overhanging ends and for this purpose the clamp units A and C are provided, being constructed in this instance to engage with the ribs $D^2$. The unit A is a duplicate of the unit C and therefore only the unit C will be described in detail.

Figure 6:
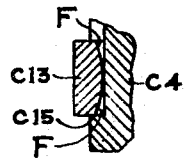
Fig. 6 is a section through a portion of the right hand clamp unit along line 6—6 of Fig. 1.
Figure 3:
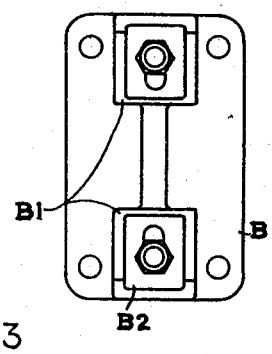
Fig. 3 is a plan view of the center clamp unit shown in Fig. 1.
Figure 2:
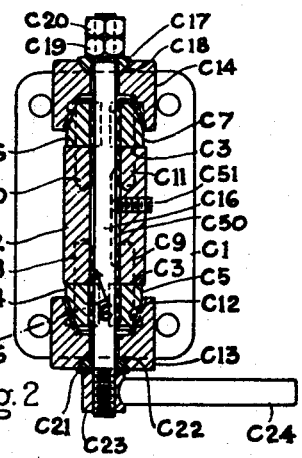
Fig. 2 is a horizontal section along line 2—2 of Fig. 1.

Unit C provides a base portion $C^1$ having an upstanding central portion $C^2$ having oppositely disposed parallel surfaces $C^3$ upon each of which a similar pair of clamp jaws are movable, the one pair being individually denoted by the characters $C^4$ and $C^5$, and the other by the characters $C^6$ and $C^7$. The respective jaws of each pair are movable toward and from one another and the pairs are each bodily shiftable relative to surfaces $C^3$, both movements being parallel to the surfaces $C^3$. The various jaws are respectively supported for such movements by pins $C^8$, $C^9$, $C^{10}$ and $C^{11}$ fixed in the base portion $C^1$, there being openings in the respective jaws to receive the ends of the pins, but enlarged to permit the jaw movement mentioned, as shown in Fig. 1 for pins $C^8$ and $C^9$. The jaws are each provided with angular surfaces illustrated by the angular surface $C^{12}$ for the jaw $C^5$. A member $C^{13}$ is provided for the one pair of clamp jaws and a similar member $C^{14}$ for the other, the members each being formed in a central portion thereof with angular surfaces complementary to the angular surfaces of the clamp jaws although other portions are relieved as illustrated at F in Fig. 6. The members $C^{13}$ and $C^{14}$ are supported by shoulders formed by the cutting away of the respective clamp jaws to form the angular surfaces thereon, as illustrated for the jaw $C^4$ at $C^{15}$ in Fig. 6. A bolt or threaded rod $C^{16}$ passes through suitable bores in the members $C^{13}$ and $C^{14}$, and between the jaws of the respective pairs of clamp jaws, which are cut away where necessary to provide suitable clearance, and through a suitable bore in the upstanding portion $C^2$, the rod being loosely fitted with all the parts mentioned, as illustrated in Fig. 2 and provided with a groove or spline $C^{50}$ engaged by a screw $C^{51}$ to prevent the rod from turning. At the one end the rod is provided with a loosely fitted washer $C^{17}$ having a partial ball shaped or spherical form fitted in a complementary formed depression $C^{18}$ in the member $C^{14}$, and is also provided with an adjusting nut $C^{19}$ threaded on the rod and with a lock nut $C^{20}$. At the other end a similarly formed washer $C^{21}$ is fitted in a complementary depression $C^{22}$ in the member $C^{13}$ and a nut $C^{23}$ in threaded engagement with the rod is provided with a handle $C^{24}$ which may be manually moved in the one or the other direction to move nut $C^{23}$ in either direction axially of the rod. A spring $C^{25}$ thrusts oppositely against jaws $C^4$ and $C^5$ tending to move the one jaw away from the other and similarly a spring $C^{26}$ thrusts the jaws $C^6$ and $C^7$ in opposite directions.

When the handle $C^{24}$ is moved in a direction to shift nut $C^{23}$ to increase the distance between nuts $C^{23}$ and $C^{19}$, the springs $C^{25}$ and $C^{26}$ force the jaws of the respective pairs apart to the limit of the movement permitted by the enlarged openings for the pins $C^8$, $C^9$, $C^{10}$, $C^{11}$ and the angular faces of the jaws then react against the angular faces of the members $C^{13}$ and $C^{14}$ to thrust the members apart and permit the jaws to move apart. The jaws are then positioned to receive the ribs $D^2$ between gripping surfaces or portions which are illustrated for the jaws $C^4$ and $C^5$ by the portions $C^{27}$ and $C^{28}$. When the work piece is clamped by the unit B, the ribs $D^2$ enter between the gripping surfaces of the various jaw pairs. The ribs of the various work pieces may vary somewhat both in thickness and in the relative position of the portions adjacent the respective jaw pairs, but irrespective of such variations, when handle $C^{24}$ is moved in a direction to reduce the distance between nuts $C^{19}$ and $C^{23}$ the angular surfaces of the members $C^{13}$ and $C^{14}$ which are then moved toward one another, react against the angular surfaces of the respective jaws and move each of the jaws toward the opposed jaw of the pair until the gripping portions contact with the rib portion and until the pin openings of the jaws are in contact with the pins $C^8$, $C^9$, etc. as in the position illustrated for the jaws $C^4$ and $C^5$ in Fig. 1. Further movement of handle $C^{24}$ in the same direction sets up a substantial pressure between the gripping portions and the work piece portion engaged thereby, but the pressure of each gripping portion being directly opposed by an equal and opposite pressure of an opposed gripping portion no unbalanced pressures can exist tending to move or to distort the work piece. The various jaws are also clamped tightly against the surfaces $C^3$ during the above described clamping movement, thus frictionally locking all the jaws of the unit to the base portion $C^1$ at the same time that the gripping portions are locked with the work piece portions. Thus the movement of the handle $C^{24}$ brings about an adjustment of all the jaws to cause the gripping portions to engage with the work piece portions and simultaneously locks the various movable parts together with the work piece portions rigidly with the base portion $C^1$ of the unit C and with base 1 and with the other clamp units.

Since for any particular work piece the rib portions gripped by the different pairs of jaws of unit C may not be positioned equally distant from the unit B, the one pair of jaws may be bodily shifted in the course of the clamping movement in the one or the other direction relative to the other pair. This results in a slight angularity of the rod $C^{16}$ relative to the parallel surfaces $C^3$ and it is for this reason, that the washers $C^{17}$ and $C^{21}$ are provided of the form described being in effect equalizing washers, whereby the rod may assume slightly angular positions and the washers will still equalize the pressure transmitted to the contacted portions of the members $C^{13}$ and $C^{14}$.

The invention described in a preferred form may in the light of this disclosure be embodied in other equivalent forms, each of which are within the spirit and scope of the following claims.

I claim:

1. In a clamping device the combination of a base, a first pair of jaws each movable to engage a work piece portion from opposite sides thereof, a second pair of jaws each movable to similarly engage another portion of the work piece, a member fixed with said base and providing a surface for each jaw parallel with the direction of jaw movement and against which the jaw moves, and means for simultaneously moving each jaw of each pair to grip its work piece portion and moving each jaw in a direction transverse to its work gripping movement, whereby to thrust each jaw against its adjacent surface as soon as both jaws of each pair have engaged the work piece.

2. In a clamping device, the combination of a base, a first pair of jaws each movable in the same plane but in opposite directions to engage a work piece portion from opposite sides thereof, a second pair of jaws each movable to similarly engage another portion of the work piece, a member fixed with said base having portions providing surfaces respectively parallel to the plane of movement of the respective jaw pairs and adjacent which the jaws of the respective pairs are movable, a plurality of parts respectively for the different jaw pairs and movable in a direction transverse to the plane of jaw movement, oppositely angular surfaces on each of said parts arranged to contact with and thereby move each jaw of the pair with which it is associated in a direction to engage its work piece portion when the part is moved toward the surface adjacent the pair, and means for simultaneously moving each of said parts toward the adjacent surface.

3. In a clamping device the combination of a base, a first pair of jaws each movable in the same plane but in opposite directions to engage a work piece portion from opposite sides thereof, a second pair of jaws spaced apart from said first pair and similarly movable in a plane parallel to the plane of movement of the first pair to engage another work piece portion, a member fixed with said base including a portion positioned between said pairs of jaws and providing parallel surfaces on the opposite faces thereof respectively adjacent the respective jaw pairs, a plurality of parts respectively associated with the different jaw pairs and movable toward one another to contact with the jaws of the respective pairs, oppositely angular surfaces on each of said parts arranged to contact with and thereby move each jaw of the pair with which it is associated in a direction to engage its work piece portion when the part is moved as described, and means adapted to simultaneously urge said parts toward one another including an equalizing washer associated with each part.

4. In a clamping device the combination of a base, a plurality of jaws each bodily movable in opposite directions in the same plane to engage a work piece on opposite sides thereof, a member fixed with said base and providing a surface substantially parallel to the plane of work engaging jaw movement and against which said jaws are positioned for movement, and means for simultaneously moving said jaws to engage said work piece, including a member movable against said jaws in a direction transverse to the plane of said surface whereby said jaws are each simultaneously clamped with said work piece and with said member.

In witness whereof I hereunto affix my signature.

WILLIAM K. ANDREW.